United States Patent [19]

Logue

[11] Patent Number: 5,758,465

[45] Date of Patent: Jun. 2, 1998

[54] CLIP AND METHOD FOR SECURING A ROD TO A CEILING

[76] Inventor: Patrick J. Logue, 480 Westwood Dr.. Barrington, Ill. 60010

[21] Appl. No.: 786,919

[22] Filed: Jan. 23, 1997

[51] Int. Cl.[6] .................................. E04B 1/38; E04B 9/00
[52] U.S. Cl. .................................. 52/506.06; 52/506.05; 52/704; 52/712; 403/403; 411/441; 411/485
[58] Field of Search ............... 52/127.1, 506.05–506.07, 52/698, 704, 712, 747.1, 747.11; 403/403, 382; 411/440, 441, 485; 248/300, 327

[56] References Cited

U.S. PATENT DOCUMENTS

| | | |
|---|---|---|
| 2,699,311 | 1/1955 | Monson . |
| 2,736,627 | 2/1956 | Horn . |
| 2,866,517 | 12/1958 | Phyl . |
| 2,990,153 | 6/1961 | Wolar . |
| 3,006,591 | 10/1961 | Somes, Jr. . |
| 3,041,035 | 6/1962 | Pascucci . |
| 3,599,921 | 8/1971 | Cumber . |
| 3,719,818 | 3/1973 | Porter et al. . |
| 3,785,598 | 1/1974 | Gillstrap . |
| 3,964,218 | 6/1976 | Ho . |
| 3,998,419 | 12/1976 | Semmerling . |
| 4,266,658 | 5/1981 | Frost et al. . |
| 4,630,423 | 12/1986 | Lind . |

*Primary Examiner*—Robert Canfield
*Attorney, Agent, or Firm*—Trexler, Bushnell, Giangiorgi & Blackstone, Ltd.

[57] ABSTRACT

A clip and method for securing a rod to a ceiling or ceiling structure for supporting from the ceiling a frame for a suspended ceiling and cable or the like above the frame. The clip includes a fastening member adapted to be fastened to the ceiling by a fastener discharged by a powder actuated tool through an aperture defined by the fastening member, and an engaging member adapted to threadingly engage the rod within a hole or passageway defined by the engaging member. A crush dimple, adapted to be deformed by the fastener, may be disposed about the aperture of the engaging member, and an internally-threaded lip may be disposed about the hole of the engaging member.

18 Claims, 2 Drawing Sheets

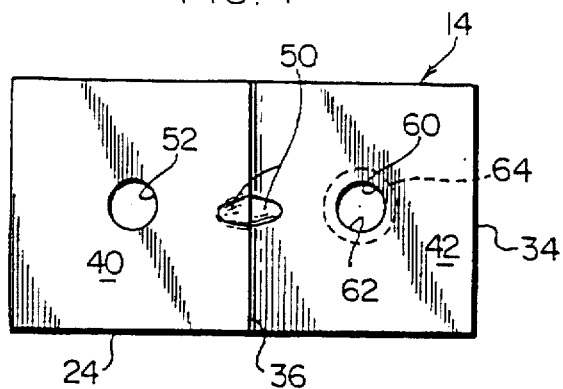
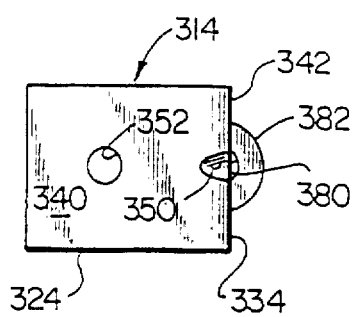
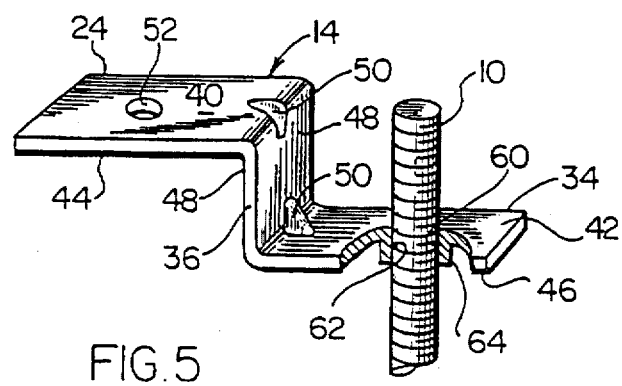
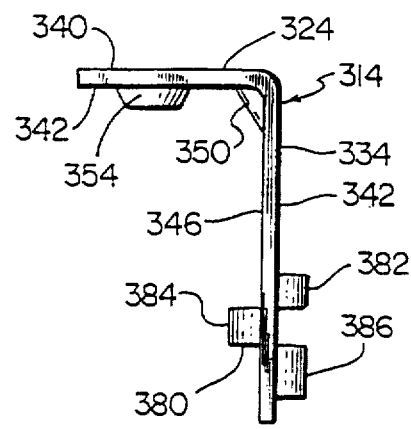
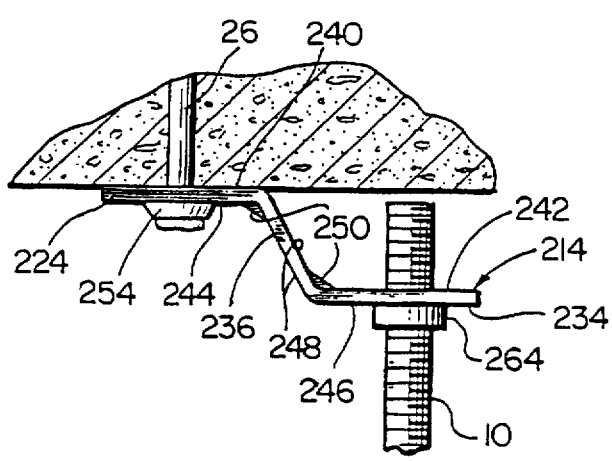
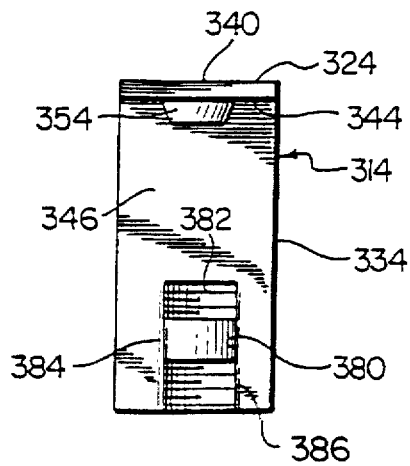

CLIP AND METHOD FOR SECURING A ROD TO A CEILING

The present invention relates to a clip and method for securing a rod to a ceiling, and, more particularly, to such a clip and method for use in connection with supporting from the ceiling a frame for a suspended ceiling and cable and the like above the frame.

BACKGROUND

There are several different methods for supporting from a steel or concrete ceiling a suspended ceiling, and cable and the like above the suspended ceiling. Typically, the suspended ceiling is supported by a frame, and the frame and the cable are supported by a plurality of rods or tie wires secured to the ceiling. The frame usually is also secured to the walls of the room. The various methods involved in supporting the frame and the cable from the ceiling are often tedious and involve several steps usually performed by personnel standing on a ladder.

For example, one known method of supporting the suspended ceiling frame from the ceiling is by discharging a fastener from a powder actuated tool into the ceiling, securing a rod coupler to the fastener, and threadingly engaging the rod coupler with a threaded rod. This process is then continuously repeated across the ceiling to secure several rods to the ceiling. The suspended ceiling frame may then be coupled to the rods by clamps, brackets or tie wires. The cable and the like also can then be coupled to the rods by bridle rings and clamps.

A shortcoming of this method of securing rods to the ceiling is that installation of each rod involves several steps which are often performed on a ladder. As a result, this method is very time consuming and results in significant expense, especially when installing suspended ceiling frames in large rooms.

Another known method of supporting the suspended ceiling frame and cable and the like from the ceiling involves securing tie wire hangers to the ceiling by a powder actuated tool. Each tie wire hanger is usually L-shaped and includes an aperture that receives an elongated tie wire. The tie wires are tied to the suspended ceiling frame to support the frame, and also may be tied to the cable to support the cable.

The tie wire hangers approach, however, has many shortcomings. For example, the tie wires are not rigid and thus can easily sway, which may affect the alignment of the suspended ceiling or the cable. As a result, the swaying action may affect the appearance of the suspended ceiling and possibly the operation of the electronic or communications devices associated with the cable. Another shortcoming of this approach is that the tie wires are tied to the frame or the conduit by the worker handling the installation, and, since the manner of tying is often unique to each worker, consistency in the manner of tying is often lacking. As a result, the integrity of the support may depend upon the individual worker.

A further shortcoming of the tie wire hangers approach is that it may be unsafe. Because each tie wire must be separately tied to the cable, the worker usually holds or supports the cable during each tying, which may lead to safety concerns. Moreover, the leading portion of the cable extends downward as each tie wire is secured to the tie wire hanger, which also may lead to safety concerns.

Accordingly, it is an object of the present invention to provide a clip and method for securing to a ceiling or ceiling structure a rod for supporting a frame for a suspended ceiling and for supporting cable and the like above the suspended ceiling frame.

It is a further object of the present invention to provide such a method that can be accomplished quickly and easily and that requires minimal ladder use.

SUMMARY

In accordance with these and other objects, a clip is provided for securing a rod or the like to a ceiling or to structure associated with the ceiling, such as, for example, beams, joists or the like. Desirably, a plurality of such clips and rods are used to support from the ceiling a frame for a suspended ceiling. Additionally, or instead, the clips and rods may be used to support cable which may be in any form, such as, for example, any type of wiring, conduit, or the like.

The clip includes a fastening member for fastening the clip to the ceiling structure (e.g., the ceiling or the structure associated with the ceiling) and an engaging member for engaging the rod. Desirably, the fastening and engaging members extend generally parallel to each other, and each includes top and bottom surfaces that are generally rectangular and generally flat. The clip may also include a connecting member joining the fastening and engaging members that has generally rectangular and generally flat lateral surfaces. The clip may include coined impressions at the juncture of the connecting member and the engaging member and at the juncture of the connecting member and the fastening member for strengthening purposes.

In accordance with preferred embodiments, the fastening and engaging members, when installed, extend generally horizontally, with the connecting member extending generally perpendicular to or, alternatively, at an obtuse angle relative to, the fastening and engaging members. In accordance with an alternative embodiment, one in which does not include a connecting member, however, the engaging member may instead extend directly from the fastening member. With this embodiment, the engaging member desirably extends perpendicular to the fastening member, so that the clip has an L-shaped configuration.

The fastening member is adapted to be fastened to the ceiling structure desirably by a powder actuated tool, which discharges a fastener through an aperture defined by the fastening member and into the ceiling. Desirably, the fastening member includes a crush dimple disposed about the aperture, which is deformed or crushed by the fastener as it is received by the aperture, to provide a secure fastening of the clip to the ceiling structure. Desirably, the rod is threaded, and the engaging member includes a threaded hole and an internally-threaded lip extending substantially around the hole for threadingly engaging the rod.

The present invention also provides a method for securing the rod to the ceiling structure that includes the steps of fastening the clip to the ceiling structure by actuating the powder actuated tool to discharge the fastener through the aperture of the fastening member and the crush dimple and into the ceiling structure, and of engaging the rod with the engaging member. These steps can be performed in either order, and are repeated to secure several rods to the ceiling structure preferably for supporting the suspended ceiling frame and the cable or the like above the frame.

With the present invention, the suspended ceiling and the cable can be supported from the ceiling structure quickly and easily. As a result, the present invention is particularly well suited for steel or concrete ceilings or the like. Although the present invention may be used with any type of cable, it is especially well suited for low voltage wiring and communications cables or the like often installed above suspended ceilings.

The present invention also facilitates installation of the clips and the rods with minimal ladder use since generally, at most, only the fastening step is performed on the ladder. For example, with the present invention, if desired, each rod can be engaged with the corresponding clip without a ladder after the clip has been fastened to the ceiling structure. Alternatively, each rod can be initially engaged with the corresponding clip, and then the clip can be fastened to the ceiling by the powder actuated tool. In either event, one or more coupling devices preferably are mounted to each rod before the rod is engaged with the corresponding clip. As a further alternative, a pole or other extension device can be used to actuate the powder actuated tool from the floor, which may eliminate ladder activity.

BRIEF DESCRIPTION OF DRAWINGS

The present invention and the advantages thereof will become more apparent upon consideration of the following detailed description when taken in conjunction with the accompanying drawings:

FIG. 4 is a top plan view of a clip similar to the clip of FIGS. 1 and 2, with the lip of the engaging member of the clip extending downward;

FIG. 5 is a broken, perspective view illustrating the rod engaged with the clip of FIG. 4;

FIG. 6 is a side plan view of a rod secured to the ceiling by a clip in accordance with a further embodiment of the invention;

FIG. 7 is a top plan view of a clip in accordance with a further alternative embodiment of the invention;

FIG. 8 is a side plan view of the clip of FIG. 7; and

FIG. 9 is a front plan view of the clip of FIGS. 7 and 8.

DETAILED DESCRIPTION OF THE PREFERRED EMBODIMENTS

Figure 1:
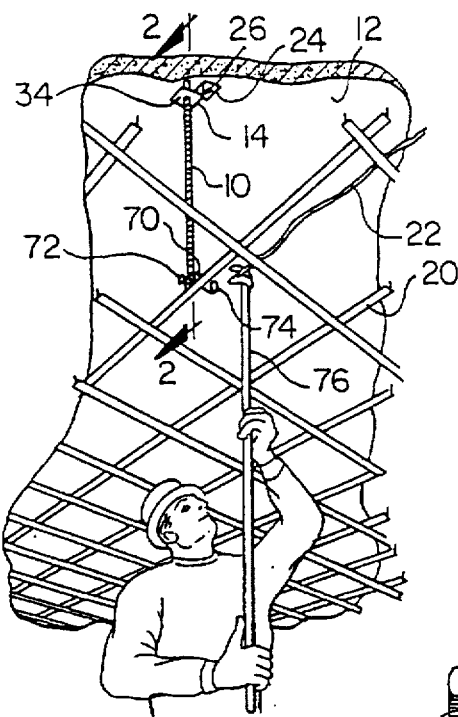
FIG. 1 is a partial perspective view illustrating a rod secured to a ceiling by a clip in accordance with one embodiment of the invention, a frame for a suspended ceiling coupled to the rod by a clamp, and a worker coupling a cable to a bridle ring engaged with the clamp.
Figure 2:
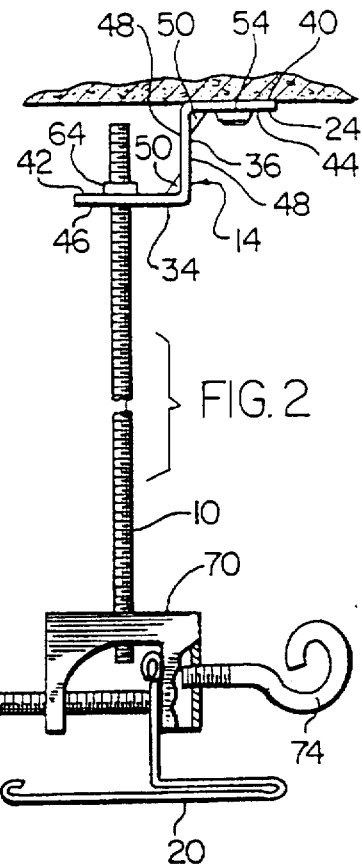
FIG. 2 is a broken view taken along the lines 2—2 of FIG. 1.
Figure 3:
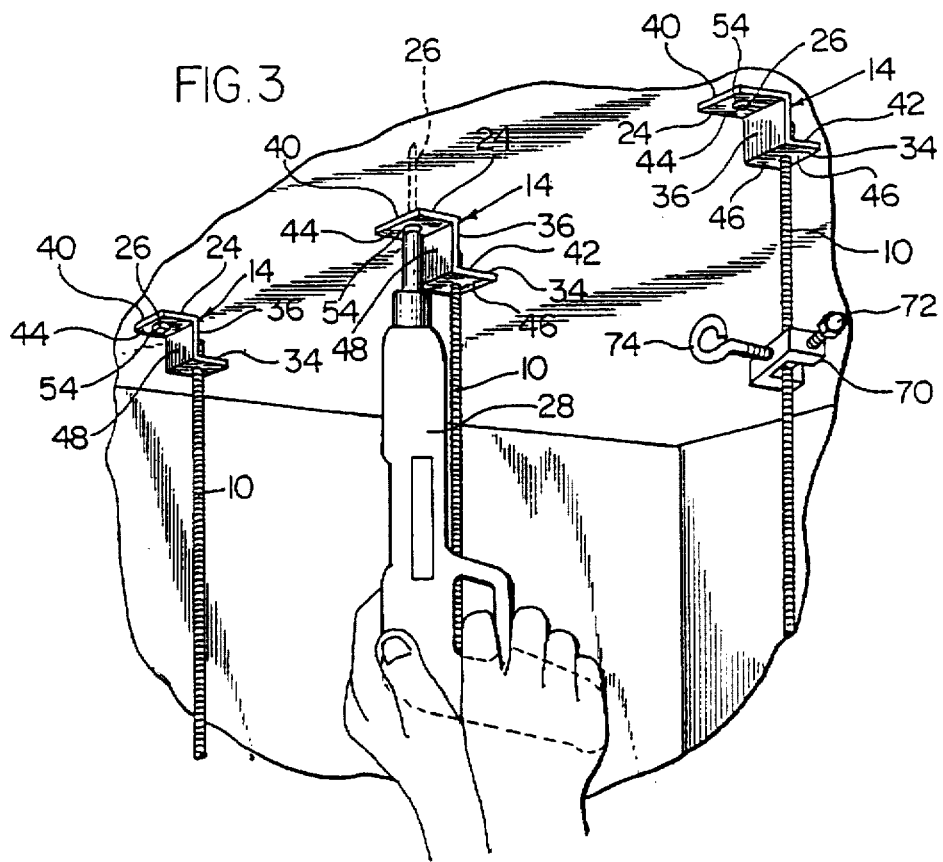
FIG. 3 is a perspective view illustrating several clips and rods of FIG. 1 and a powder actuated tool and illustrating with dashed lines a fastener, discharged by the powder actuated tool, fastening one of the clips to the ceiling.

FIGS. 1-3 illustrate a threaded rod 10 secured to a ceiling 12 by a clip 14 in accordance with one embodiment of the invention. The rod 10 is coupled to a frame 20 for a suspended ceiling and to a cable 22, such as wiring, conduit or the like, in any manner suitable to support the frame and the cable. Desirably, the frame 20 is also secured to walls in any suitable manner (not shown).

The clip 14 includes a fastening member 24 adapted to be fastened to the ceiling 12 by a fastener 26 discharged by a powder actuated tool 28, an engaging member 34 adapted to threadingly engage the rod 10, and a connecting member 36 connecting the fastening and engaging members. The fastening and engaging members 24 and 34 of the clip 14 extend generally parallel to each other, and include generally flat and generally rectangular top surfaces 40 and 42 and generally flat and generally rectangular bottom surfaces 44 and 46. The connecting member 36 includes generally flat and generally rectangular lateral surfaces 48, and extends generally perpendicular to the fastening and engaging members 24 and 34. Desirably, coined impressions 50 are included at the juncture of the connecting member 36 and the fastening member 24 and the juncture of the connecting member 36 and the engaging member 34 to increase the strength of the clip 14 (see, e.g., FIGS. 2, 4 and 5).

The fastening member 24 of the clip 14 defines an aperture 52 for receiving the fastener 26, and desirably includes a crush dimple 54 disposed about the aperture 52 to facilitate rigid securement of the clip 14 to the ceiling 12. The crush dimple 54 is adapted to deform or crush as the fastener 26 passes through the aperture 52. In the illustrated embodiments, the crush dimple 54 is in the form of a truncated cone extending from the bottom surface 44 of the fastening member 24. Alternatively, the crush dimple 54 may have any other suitable configuration, such as, for example, a thin dome or the like that substantially covers the aperture 52.

The engaging member 34 of the clip 14 defines a hole 60 for receiving the rod 10. The annular wall 62 defining the hole preferably is threaded for threadingly engaging the rod 10. The engaging member 34 desirably includes a tap or lip 64 disposed about the hole 60 for providing a secure engagement between the rod 10 and the engaging member. The lip 64 preferably extends annularly around the hole 60 and is internally threaded. The lip 64 may be in the form of a truncated cone, which extends generally upward from the top surface 42 of the engaging member 34 (see, e.g., FIG. 2), or, if desired, generally downward from the bottom surface 46 of the engaging member (see, e.g., FIGS. 4 and 5).

The rod 10 may be coupled to the frame 20 and to the cable 22 in any suitable manner, such as, for example, by one or more coupling devices. In FIGS. 1 and 2, for example, the rod 10 is threadingly engaged with a beam clamp 70 having a set screw 72 which engages the frame 20. A bridle ring 74 may be threadingly engaged with the beam clamp 70 for engaging the cable 22 (see also FIG. 3). In FIG. 1, a worker is shown inserting the cable 22 through the bridle ring 74 by an extension device 76 adapted to releasably engage the cable. If desired, the cable 22 may be coupled to the rod 10 by a separate clamp and bridle ring or by any other suitable coupling device.

The present invention also provides a method for securing the rod 10 to the ceiling 12 or to structure associated with the ceiling such as, for examples, beams, joists or the like. The method includes the steps of fastening the clip 14 to the ceiling structure (e.g., the ceiling 12 or structure associated with the ceiling) by actuating the powder actuated tool 28 to discharge the fastener 26 through the aperture 52 of the fastening member 24, and engaging the engaging member 34 of the clip 14 with the rod 10. These two steps can be performed in either order.

During the fastening step, the fastener 26 deforms the crush dimple 54. During the engaging step, the engaging member 34 may threadingly or grippingly engage the rod 10, or may engage the rod 10 in any other suitable manner. The fastening and engaging steps are repeated with several rods 10, and the frame 20 for the suspended ceiling and the cable 22 are coupled to the rods to support the frame and the cable.

FIG. 6 illustrates a clip 214 in accordance with an alternative embodiment of the invention wherein the connecting member 236 extends angularly from the fastening member 224 to the engaging member 234. The angle formed by the connecting member 236 and the fastening and engaging members 224 and 234 may have any suitable magnitude. In accordance with a preferred embodiment, however, the connecting member 236 extends at an obtuse angle that desirably has a magnitude of about 135°.

FIGS. 7–9 illustrate a clip 314 in accordance with a further alternative embodiment of the invention that does not include a connecting member. With this embodiment, the fastening and engaging members 324 and 334 form an L-shaped configuration, and the engaging member 334 defines a passage 380 for engaging the threaded rod 10. The passage 380 may be formed in any suitable manner such as, for example, by a punch impression or the like imposed on one of the surfaces 342 or 346 of the engaging member 334.

In the embodiment illustrated in FIGS. 7–9, the passage 380 is defined by engaging elements 382, 384 and 386 which are adapted to engage the rod 10. Desirably, the engaging elements 382, 384 and 386 are generally arcuate, preferably having an arc length of about 180°. The engaging elements 382 and 386 preferably protrude outward from surface 342 of the engaging member 334, and the engaging element 384 protrudes outward in an opposite direction from surface 346 of the engaging member. The engaging elements 382, 384 and 386 may be threaded for threadingly engaging the rod 10, or alternatively, may be adapted to grippingly engage the rod. Coined impression 350 may be included at the juncture of the fastening and engaging members 324 and 334.

With the present invention, the suspended ceiling frame 20 and the cable 22 can be supported from the ceiling structure quickly and easily, and, as a result, is particularly well suited for a steel or concrete ceiling or the like. The clips in accordance with the present invention may be used with any type of cable 22, but it is especially well suited for low voltage wiring and communications cables which are often installed above a suspended ceiling frame.

The clips in accordance with the present invention and the rods 10 can be installed with minimal ladder use since generally only the fastening step is performed on the ladder. If desired, each rod 10 can be engaged with the corresponding clip without a ladder after the clip has been fastened to the ceiling structure. Alternatively, each rod 10 can be initially engaged with the corresponding clip, and then the clip can be fastened to the ceiling 12 by the powder actuated tool 28. In either event, the clamp 70 and bridle ring 74 or other coupling devices preferably are mounted to the rod before the rod is engaged with the clip. If desired, a pole or other extension device can be used to actuate the powder actuated tool 28 from the floor which may eliminate ladder use altogether.

The foregoing description is for purposes of illustration only and is not intended to limit the scope of protection accorded this invention. The scope of protection is to be measured by the following claims, which should be interpreted as broadly as the inventive contribution permits.

The claimed invention is:

1. A clip for securing a rod to a ceiling structure, the clip comprising:
   (a) a fastening member adapted to be fastened to the ceiling structure by a fastener discharged by a powder actuated tool, the fastening member defining an aperture adapted to receive the fastener and including a crush dimple disposed about the aperture adapted to be deformed by the fastener;
   (b) an engaging member defining a threaded hole for threadingly engaging the rod and including a lip disposed about the hole also adapted to engage the rod; and
   (c) a connecting member joining the fastening and engaging members such that the fastening and engaging members extend generally parallel to each other.

2. The clip of claim 1 wherein the crush dimple is in the form of a truncated cone.

3. The clip of claim 1 wherein the lip is threaded and is adapted to threadingly engage the rod.

4. The clip of claim 1 wherein the connecting member extends generally perpendicular to the fastening and engaging members.

5. The clip of claim 4 wherein the lip is internally-threaded for threadingly engaging the rod.

6. The clip of claim 1 wherein the connecting member extends from the fastening member toward the engaging member at an obtuse angle.

7. The clip of claim 6 wherein the lip is internally-threaded for threadingly engaging the rod.

8. The clip of claim 1 further including at least one coined impression at a juncture of the connecting member and the engaging member.

9. The clip of claim 1 further including at least one coined impression at a juncture of the connecting member and the fastening member.

10. A clip for securing a rod to a ceiling structure, the clip comprising:
   (a) a fastening member adapted to be fastened to the ceiling structure by a fastener discharged by a powder actuated tool, the fastening member defining an aperture adapted to receive the fastener and including a crush dimple disposed about the aperture adapted to be deformed by the fastener; and
   (b) an engaging member adapted to threadingly engage the rod;
   wherein the engaging member includes a plurality of engaging elements that define a passageway adapted to receive the rod.

11. The clip of claim 10 wherein the engaging elements are generally arcuate.

12. The clip of claim 11 wherein one of the engaging elements extends in a direction opposite the other engaging elements.

13. The clip of claim 11 wherein at least one of the engaging elements is threaded to threadingly engage the rod.

14. A method of securing a threaded rod to a ceiling structure comprising the steps of:
   (a) fastening a clip to the ceiling structure by discharging a fastener from a powder actuated tool through an aperture defined by a fastening member of the clip and thereby deforming a crush dimple disposed about the aperture; and
   (b) threadingly engaging the threaded rod with an annular threaded wall of an engaging member of the clip that defines a hole receiving the rod and with an internally-threaded lip disposed about the hole, the engaging member and fastening member extending generally parallel to each other and being joined together by a connecting member.

15. The method of claim 14 herein steps (a)–(b) are repeated to secure a plurality of threaded rods to the ceiling structure.

16. A method of securing a threaded rod to a ceiling structure comprising the steps of:
   (a) fastening a clip to the ceiling structure by discharging a fastener from a powder actuated tool through an aperture defined by a fastening member of the clip; and
   (b) threadingly engaging the threaded rod with an engaging member of the clip, the rod being received within a passageway defined by a plurality of arcuate engaging elements of the engaging member and being threadingly engaged with the engaging elements.

17. A method for supporting from a ceiling structure a plurality of rods, the method of comprising the steps of:

(a) fastening a clip to the ceiling structure by discharging a fastener from a powder actuated tool through an aperture defined by a fastening member of the clip and thereby deforming a crush dimple disposed about the aperture;

(b) engaging with an engaging member of the clip a threaded rod adapted to be coupled to the frame by inserting the rod through a hole defined by an annular threaded wall of the engaging member and threadingly engaging the rod with the wall and an internally-threaded lip disposed about the hole, the engaging member extending generally parallel to the fastening member and being joined to the fastening member by a connecting member; and (c) repeating steps (a)–(b) to secure a plurality of rods threaded to the ceiling structure.

18. A method for supporting from a ceiling structure a plurality of rods, the method comprising the steps of:

(a) engaging with an engaging member of a clip a rod adapted to be coupled to the frame by inserting the rod through a hole defined by an annular threaded wall of the engaging member and threadingly engaging the rod with the wall and an internally-threaded lip disposed about the hole;

(b) fastening the clip to a ceiling structure by discharging a fastener from a powder actuated tool through an aperture defined by a fastening member of the clip and thereby deforming a crush dimple disposed about the aperture; and (c) repeating steps (a)–(b) to secure a plurality of rods to the ceiling structure.

\* \* \* \* \*